United States Patent
Watanabe et al.

(10) Patent No.: US 8,241,540 B2
(45) Date of Patent: Aug. 14, 2012

(54) METHOD OF MANUFACTURING LIQUID DISCHARGE HEAD

(75) Inventors: Masahisa Watanabe, Yokohama (JP); Shuji Koyama, Kawasaki (JP); Kenji Ono, Tokyo (JP); Kenji Fujii, Hiratsuka (JP); Shuhei Oya, Oita (JP); Seiko Minami, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 12/574,352

(22) Filed: Oct. 6, 2009

(65) Prior Publication Data

US 2010/0102473 A1    Apr. 29, 2010

(30) Foreign Application Priority Data

Oct. 29, 2008 (JP) .................................. 2008-278461

(51) Int. Cl.
| B29C 47/76 | (2006.01) |
| B29C 33/76 | (2006.01) |
| B29B 7/30 | (2006.01) |
| F26B 5/04 | (2006.01) |
| F26B 7/00 | (2006.01) |

(52) U.S. Cl. .......... 264/101; 264/313; 264/317; 34/403; 34/423

(58) Field of Classification Search .................. None
See application file for complete search history.

(56) References Cited

U.S. PATENT DOCUMENTS

| 5,081,474 | A | 1/1992 | Shibata et al. |
| 6,074,543 | A | 6/2000 | Yoshihira et al. |
| 6,180,018 | B1 | 1/2001 | Miyagawa et al. |
| 6,378,992 | B2 | 4/2002 | Kudo et al. |
| 6,378,993 | B1 | 4/2002 | Ozaki et al. |
| 7,287,847 | B2 | 10/2007 | Fujii et al. |
| 7,300,596 | B2 | 11/2007 | Murayama et al. |
| 7,475,966 | B2 | 1/2009 | Fujii et al. |
| 7,523,553 | B2 | 4/2009 | Ohsumi et al. |
| 2002/0160211 | A1* | 10/2002 | Kurita et al. .................. 428/458 |
| 2007/0120902 | A1 | 5/2007 | Ozaki et al. |
| 2007/0252872 | A1 | 11/2007 | Fujii et al. |
| 2009/0183368 | A1 | 7/2009 | Ohsumi et al. |

FOREIGN PATENT DOCUMENTS

JP  2004-090575  3/2004

\* cited by examiner

*Primary Examiner* — Christina Johnson
*Assistant Examiner* — Benjamin Schiffman
(74) *Attorney, Agent, or Firm* — Fitzpatrick, Cella, Harper & Scinto

(57) ABSTRACT

A method of manufacturing a liquid discharge head including a flow path member for forming a flow path communicating with a discharge port discharging a liquid includes forming a mold of the flow path made of a positive photosensitive resin on a substrate; applying a coated layer on the mold for forming the flow path member, which coated layer includes a solvent, an epoxy resin, and a curing agent of the epoxy resin; removing the solvent from the coated layer at a normal temperature under substantially 1 atm. so that the weight of the coated layer may become 93% or less of that thereof at a time of applying of the coated layer, and then further removing the solvent from the coated layer under a depressurized condition; curing the coated layer; and removing the mold to form the flow path.

7 Claims, 2 Drawing Sheets

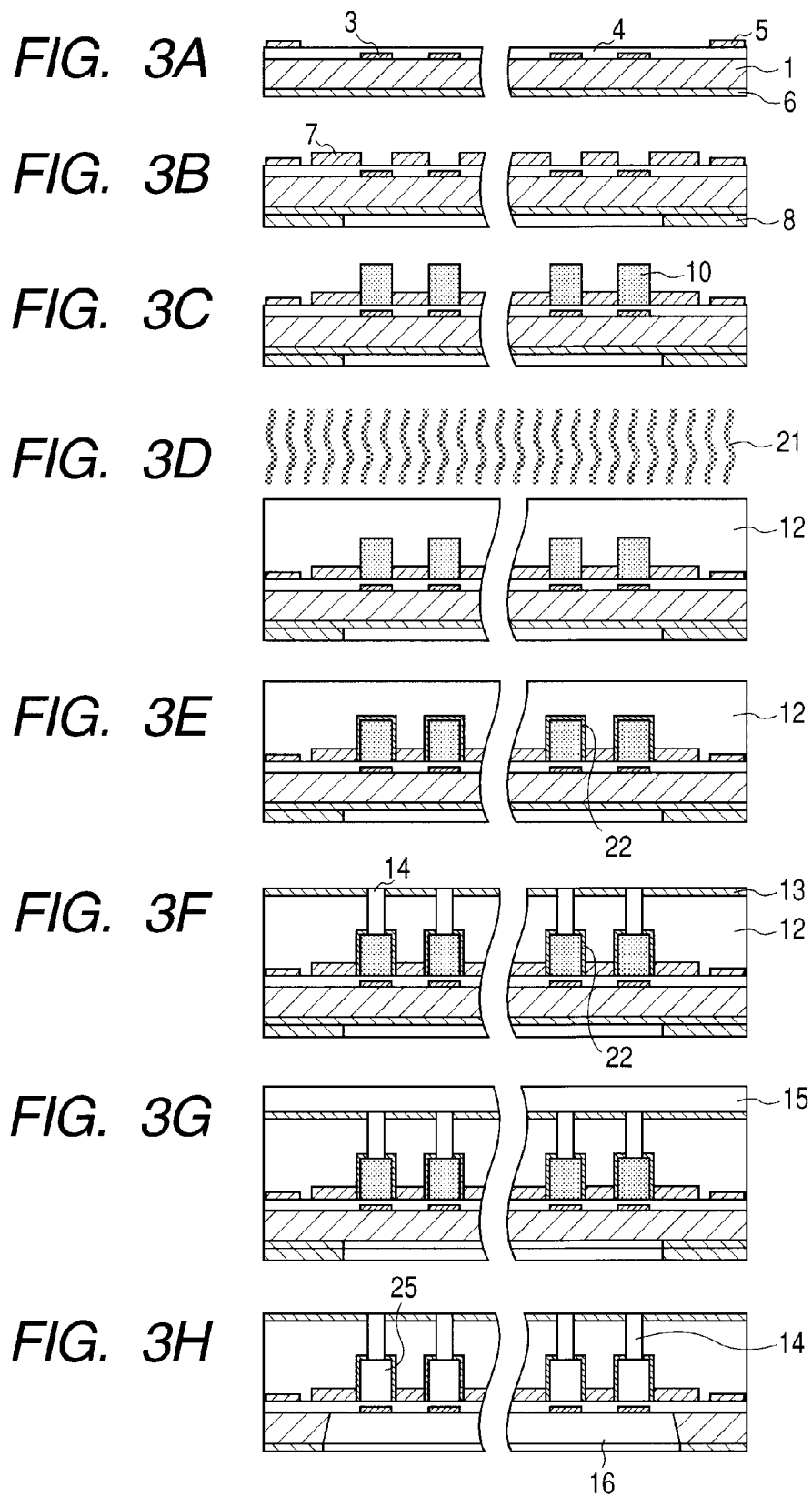

METHOD OF MANUFACTURING LIQUID DISCHARGE HEAD

BACKGROUND OF THE INVENTION

1. Field of the Invention

The present invention relates to a liquid discharge head discharging a liquid and a method of manufacturing the liquid discharge head, and more particularly to a liquid discharge head for performing recording by discharging an ink onto a recording medium and a method of manufacturing the liquid discharge head.

2. Description of the Related Art

As an example of the liquid discharge head discharging a liquid, an ink jet printing system performing recording by discharging an ink onto a recording medium can be given.

A liquid discharge head to be applied to the ink jet printing system (liquid jet recording system) is generally equipped with a plurality of minute discharge ports, liquid flow paths, and energy generating elements, each of which energy generating elements is provided at a part of each of the liquid flow paths and generates energy to be used for discharging a liquid. As a conventional method of manufacturing such a liquid discharge head, for example, Japanese Patent Application Laid-Open No. 2004-090575 discloses as follows.

First, a pattern of flowing paths is formed of a resolvable resin on a wafer-shaped silicon substrate, on which energy generating elements are formed. Next, a coated resin layer, which becomes flow path walls and includes epoxy resin and cationic photoinitiator, is applied on the mold member in the shape of the flow paths, and after that, the solvent in the coated resin layer is removed at a normal temperature under a depressurized condition. Next, the discharge ports are formed on the energy generating elements by the photolithography. Last, the resolvable resin is eluted and the flow paths are formed. Then, the coated resin layer to become the flow path walls is cured.

Japanese Patent Application Laid-Open No. 2004-090575 describes that the solvent is vaporized from a part near to the mold member situated at a deep part of the coated resin layer under the depressurized condition and the solvent is removed from the compatible layer, which is formed by the intermingling of the coated resin layer and the mold member. Because the compatible layer remains together with the coated resin layer after the cure thereof after the removal of the mold member, the compatible layer exerts a great influence on the capacity of the flow paths.

However, if the wafer-shaped substrate grows in size, the dispersion of the compatible layer sometimes becomes larger in each position within the wafer. Consequently, it is required to reduce the dispersion of the thickness of the compatible layer within the wafer more and more.

SUMMARY OF THE INVENTION

The present invention is directed to provide a method of manufacturing a liquid discharge head in which the thickness of the layer formed by the intermingling of a coated resin layer and a mold member is furthermore uniformed among a plurality of liquid discharge heads to enable the formation of the flow paths with a high degree of accuracy.

A method of manufacturing a liquid discharge head including a flow path member for forming a flow path communicating with a discharge port discharging a liquid comprises the steps of: forming a mold of the flow path made of a positive photosensitive resin on a substrate; applying a coated layer on the mold for forming the flow path member, the coated layer including a solvent, an epoxy resin, and a curing agent of the epoxy resin; removing the solvent from the coated layer at a normal temperature under substantially 1 atm. so that the weight of the coated layer may become 93% or less of that of the coated layer at a time of the applying of the coated layer, and then further removing the solvent from the coated layer under a depressurized condition; curing the coated layer; and removing the mold to form the flow path.

According to the present invention, the thickness formed by the intermingling of the coated resin layer and the mold member is made to be uniform among a plurality of liquid discharge heads, and consequently the flow path can be formed with a high degree of accuracy.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G, and 3H are schematic process charts illustrating an example of an embodiment of the present invention.

DESCRIPTION OF THE EMBODIMENTS

A preferred embodiment of the present invention will now be described in detail in accordance with the accompanying drawings.

Incidentally, a liquid discharge head can be mounted in apparatus such as a printer, a copier, a facsimile machine including a communication system, a word processor including a printer unit, and industrial recording apparatus combined with various processing apparatus compositively. Then, by using the liquid discharge head, recording on various recording media, such as paper, a thread, a fiber, cloth, leather, a metal, plastics, glass, wood, and ceramics, can be performed. Incidentally, in the present description, the word "record" is supposed to mean not only to give an image having a meaning, such as a character and a figure, to a recording medium, but also to give an image having no meanings, such as a pattern.

Because the thickness of a compatible material layer formed between a coated resin composition and a resolvable resin composition can be made to be more constant and thin by the manufacturing method of the present invention, a liquid discharge head having a constant ink re-filling speed can be manufactured.

In the following, an embodiment of the present invention will be described more concretely with reference to the drawings. Incidentally, the present invention is not limited to the following embodiment. Moreover, an ink jet head will be exemplified as an example of the liquid discharge head in the following description.

Figure 2:
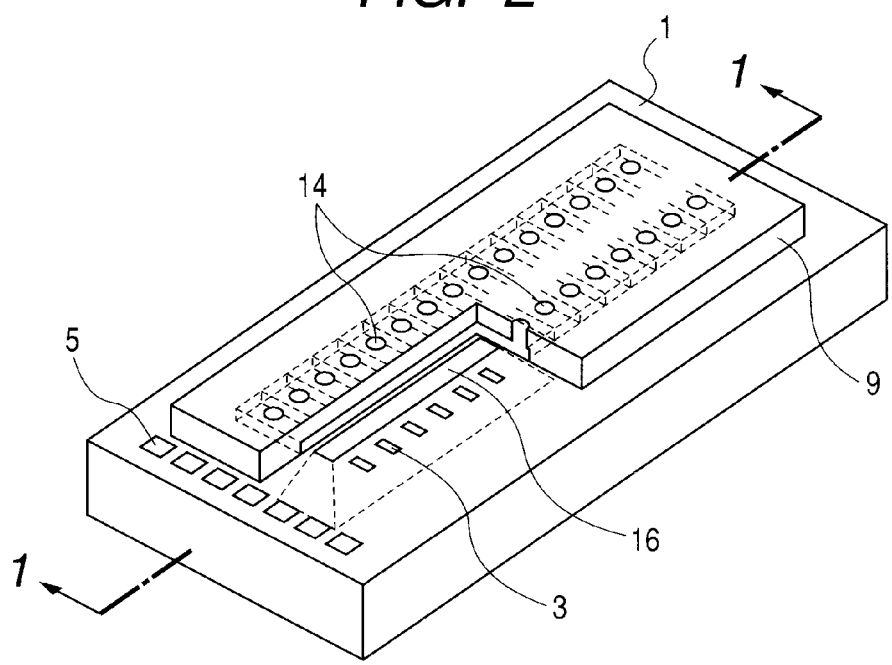
FIG. 2 is a schematic perspective view illustrating an example of a liquid discharge head manufactured in accordance with the present invention.

FIG. 2 is a schematic perspective view of the ink jet head. The ink jet head of the present embodiment has a substrate (made of, for example, silicon) 1 on which energy generating elements (electrothermal conversion elements) 3 are formed to be arranged in juxtaposition of two columns in a predetermined pitch. A common ink supply port 16 opens into the substrate 1 between the two columns of the energy generating elements 3. Ink discharge ports 14 opening above the respective energy generating elements 3 and ink flow paths communicating from the ink supply port 16 to the respective ink discharge ports 14 are formed in a nozzle layer 9 constituting a nozzle forming member on the substrate 1.

Here, a process for manufacture of the ink jet head of FIG. 1 will be described with reference to FIGS. 3A, 3B, 3C, 3D, 3E, 3F, 3G, and 3H.

FIGS. 3A, 3B, 3C, 3D, 3E, 3F, 3G, and 3H are schematic views illustrating the internal configuration of the ink jet head of FIG. 2, and are the schematic views for illustrating the basic manufacturing process of the ink jet head of the present invention.

The plurality of ink discharge energy generating elements 3, such as heating resistors, is arranged on the substrate 1 illustrated in FIG. 3A. Moreover, the whole back surface of the substrate 1 is covered by $SiO_2$ film 6. A protective film 4 protects the energy generating elements 3. Then, a sacrifice layer (not illustrated) that will be sacrificed at the time of forming the ink supply port 16 with an alkaline solution in a post-process is provided over the substrate 1. The sacrifice layer can be etched with the alkaline solution, and is made of polysilicon, aluminum, aluminum silicon, aluminum copper, aluminum silicon copper, and the like. The etching speeds of the above-mentioned materials except the polysilicon are fast. Incidentally, semiconductor elements for driving the energy generating elements 3, wiring, and the like are not illustrated.

First, as illustrated in FIG. 3B, a polyether amide resin 7 and a polyether amide resin 8 are applied on the front surface and the back surface of the substrate 1, respectively, by the spin coat method or the like, and the polyether amide resins 7 and 8 are cured by baking. Then, in order to pattern the polyether amide resin 7, a positive photoresist is applied on the polyether amide resin 7 by the spin coat method or the like, and the positive photoresist is exposed and developed. Then, the polyether amide resin 7 is patterned by the dry etching or the like, and then the positive photoresist is peeled off. Then, in order to pattern the polyether amide resin 8 provided on the back surface of the substrate 1 by the process similar to that of the front surface thereof, the positive photoresist is applied on polyether amide resin 8 on the back surface by the spin coat method or the like, and the positive photoresist is exposed and developed. Then, the polyether amide resin 8 is patterned by the dry etching or the like, and then the positive photoresist is peeled off.

Then, as illustrated in FIG. 3C, an ink flow path pattern 10 having the shape of the ink flow paths is formed of a resolvable resin. The resolvable resin for forming the ink flow path pattern 10 is not especially limited. For example, the positive photoresist, especially a photolytic positive photoresist having a comparatively high molecular weight can be suitably used in order not to cause any deformation at the time of laminating the coated resin composition in the post-process. To put it more concretely, for example, polymethyl isopropyl ketone or polyvinyl ketone can be suitably used. As the forming method of the ink flow path pattern 10, for example, the method of applying a mixture of a resolvable resin and a solvent on the substrate 1 by the spin coat method or the like to form the pattern by the photolithographic method or the like can be used. As the solvent to be used for the resolvable resin, for example, cyclohexanone can be used. The film thickness of the flow path pattern 10 on the substrate 1 is suitably within a range of 10 to 20 μm. Moreover, as the resolvable resin, for example, a positive photoresist can be given. As a concrete example, polymethyl isopropenyl ketone (trade name: ODUR 1010 available from Tokyo Ohka Kogyo Co., Ltd.) can be given.

As illustrated in FIG. 3D, a coated resin composition, which is a material for forming the ink flow paths on the front surface, is applied on the flow path pattern 10 by the spin coat method or the like to form a coated resin layer 12. As the coated resin composition, for example, a negative photosensitive resin, especially a material of an epoxy resin composition, capable of performing cationic polymerization, dissolved in xylene, can be given.

Incidentally, the solubility parameter (SP) value of the solvent (xylene) included in the coated resin composition is 8.8. The SP value of the solvent (cyclohexanone) used for the resolvable resin is 8.2. Generally, if there is a difference of about ±1 in SP values, the solvent and the solution easily have compatibility.

Next, as illustrated in FIG. 3D, the substrate 1 is left as it is until the weight of the coated resin layer 12 becomes 93% or less of the initial weight thereof after the application. The temperature of leaving the substrate as it is preferably less than 60° C., and an environment of atmospheric pressure and room temperature (about 25 to 30° C.) is more suitable. The atmospheric pressure is suitably within a range of 1000-1020 hecto Pa. The above temperatures are suitable because the compatibility is suppressed by lowering the temperature. Moreover, although the solvent can be removed under a depressurized condition, it is effective to volatilize the solvent by leaving the substrate 1 as it is at the room temperature under the atmospheric pressure. As a primary factor of the reason of the suitableness of the above ambient environment, the following is conceivable. When the coated resin layer 12 is applied on the flow path pattern 10, a compatible layer is produced, and the heat of dissolution is produced. On the other hand, the outermost layer of the coated resin layer 12 is at room temperature. The solvent volatilizes from the outermost layer, and the solvent in a compatible region moves to the part of the outermost layer, in which the solvent has become less, by convection, and consequently the amount of the solvent in the part that has been in the compatible state at the beginning becomes small. Convection can be efficiently caused under the atmospheric pressure. It is conceivable that the amount of the solvent in the compatible region can be efficiently decreased by the convection.

The initial weight of the coated resin layer 12 can be grasped by, for example, measuring the weights of the wafer before and after the formation of the coated resin layer 12. The volatilization of the solvent is performed until the weight of the coated resin composition becomes 93% or less of the weight (initial weight) of the coated resin composition just after the application thereof. Moreover, the volatilization is preferably performed until the weight of the coated resin composition becomes 90% or less of the initial weight, and 87% or less is more suitable.

Next, as illustrated in FIG. 3E, after the ascertainment of the fact that the weight of the coated resin layer 12 becomes 93% or less of the initial weight, the volatilization of the solvent is performed under the depressurized condition. The depressurized condition is suitably 90 kPa (900 hecto Pa). Furthermore, baking processing is performed by heating. The baking processing is suitably performed within a temperature range of 60-100° C., and is more suitably performed within a temperature range of 80-95° C. The film thickness of the coated resin layer 12 on the flow path pattern 10 after the baking processing is about 10 to 60 μm in the case of including no compatible layers, and is about 20 to 80 μm on the substrate 1.

Here, because the solvent in the coated resin composition has been volatized by a predetermined volume before the processing under the depressurized condition in the present invention, the layer thickness of the compatible material layer 405 can be more constant and thinner.

Next, as illustrated in FIG. 3F, exposure and development are preformed to form the pattern of the coated resin layer 12.

A water repellent 13 is formed on the coated resin layer 12 by laminating dry films or the like. The ink discharge ports 14 are formed by patterning the coated resin layer 12 and the water repellent 13 by the exposure and development with an ultraviolet (UV) ray, a deep UV ray, or the like. By the former removal of the solvent at the normal temperature under the atmospheric pressure, the amount of the solvent in the compatible region of the coated resin layer 12 and the ink flow path pattern 10 has become small. Consequently, the progress of curing from the coated resin layer 12 to the compatible region after the exposure can be suppressed. To put it concretely, the diffusion of cations from the coated resin layer 12 to the compatible region is suppressed, and thereby the ultimate compatible region can be thin.

Next, as illustrated in FIG. 3G, a protective material 15 is applied on the front surface and the side surface of the substrate 1, in which the ink flow path pattern 10, the coated resin layer 12, and the like are formed, to cover both the surfaces with the protective material 15. The $SiO_2$ film 6 formed on the back surface of the substrate 1 is subjected to masking with polyether amide resin 8, and a Si surface as a starting surface of wet etching is exposed. Next, the ink supply port 16 is formed in the substrate 1. The ink supply port 16 is provided by chemically etching the substrate 1, for example, by anisotropic etching using a strong alkaline solution, such as tetramethyl ammonium hydroxide (TMAH).

Then, as illustrated in FIG. 3H, by the execution of the anisotropic etching from the back surface, the anisotropic etching reaches the sacrifice layer (not illustrated) of the front surface to form the ink supply port 16. Next, the polyether amide resin 8 and the protective material 15 are removed. Furthermore, by eluting the ink flow path pattern 10 from the ink discharge ports 14 and the ink supply port 16, the ink flow paths (not illustrated) and flow paths 25 are formed.

Next, the substrate 1, in which nozzle portions are formed, are cut to be separated with a dicing saw or the like to be made into chips. Thus, a part of the ink jet head of FIG. 2 is completed.

After that, electric joining for driving the energy generating elements is performed, and a tank member for supplying ink is attached. Thus, the ink jet head is completed.

By the manufacturing method according to the present invention, the dispersion of the layer thickness of the compatible material layer can be made to be small. Incidentally, there is a tendency for the re-filling speed of ink to be slow at a thick part of the compatible material layer.

Here, the thickness of the compatible material layer after the heating is suitably thinner. According to the examination by the inventors, the influences to the re-filling speed owing to the dispersion of the thickness become less by setting the thickness to 2.5 μm or less. More suitably, the thickness is 2.0 μm or less.

Example

In the following, an example of the present invention will be described with reference to the drawings. Incidentally, the present invention is not limited to the following example.

Figure 1:
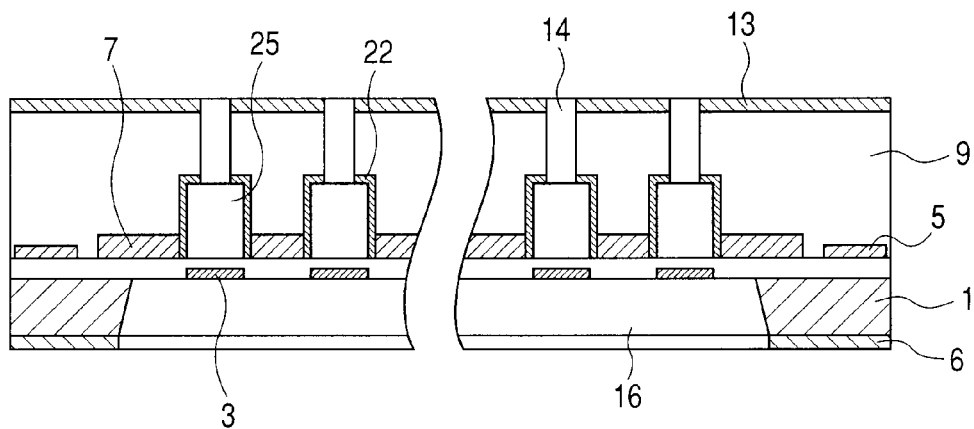
FIG. 1 is a schematic view illustrating a part of a liquid discharge head manufactured in accordance with the present invention.

In the present example, an ink jet head having the configuration illustrated in FIG. 1 was produced by the process illustrated in FIGS. 3A, 3B, 3C, 3D, 3E, 3F, 3G, and 3H.

First, as illustrated in FIG. 3A, a wafer-shaped substrate 1 on which a plurality of ink discharge energy generating elements 3, such as heating resistors, was arranged, was prepared. Moreover, the whole back surface of the substrate 1 was covered by $SiO_2$ film 6, and the energy generating elements 3 were covered by a protective film 4. Then, a sacrifice layer (not illustrated) that would be sacrificed at the time of forming the ink supply port 16 with an alkaline solution in a post-process was formed over the substrate 1.

Next, as illustrated in FIG. 3B, a polyether amide resin 7 and a polyether amide resin 8 were applied on the front surface and the back surface of the substrate 1, respectively, by the spin coat method or the like, and the polyether amide resins 7 and 8 were cured by baking. Then, in order to pattern the polyether amide resin 7, a positive photoresist was applied on the polyether amide resin 7 by the spin coat method or the like, and the positive photoresist was exposed and developed. Then, the polyether amide resin 7 was patterned by the dry etching or the like. After that, the positive photoresist was peeled off to be removed. Then, in order to pattern the polyether amide resin 8 formed on the back surface of the substrate 1 by the process similar to that of the front surface thereof, the positive photoresist was applied on polyether amide resin 8 on the back surface by the spin coat method or the like, and the positive photoresist was exposed and developed. Then, the polyether amide resin 8 was patterned by the dry etching or the like. After that, the positive photoresist was peeled off to be removed.

Next, as illustrated in FIG. 3C, a resolvable resin composition of a mold material of ink flow paths was applied by the spin coat method, and was exposed and developed to form a pattern 10. The film thickness of the pattern 10 was made to be 18 μm. Moreover, as the resolvable resin composition, polymethyl isopropenyl ketone (trade name: ODUR 1010 available from Tokyo Ohka Kogyo Co., Ltd.) was used. As the solvent, cyclohexanone was used.

Next, as illustrated in FIG. 3D, a coated resin composition, which was a material for forming the ink flow paths on the pattern 10, was applied by the spin coat method to form a coated resin layer 12. As the coated resin composition, a material of EHPE (trade name) dissolved in xylene was used. The film thickness of the coated resin layer 12 was made to be 75 μm on the substrate 1.

Incidentally, the composition of the coated resin composition was as follows.

EHPE available from Daicel Chemical Industries, Ltd. (epoxy resin) 100

HFAB available from Central Glass Co., Ltd. (additive) 20

A-187 available from Dow Corning Toray Co., Ltd. (adhesion improver) 5

SP-172 available from Adeka Corporation (photopolymerization initiator) 6

Xylene (solvent) 80

The SP value of the solvent (xylene) included in the coated resin composition was 8.8. The solvent of the resolvable resin composition (positive photoresist) was cyclohexanone, and the SP value of the solvent was 8.2.

Next, as illustrated in FIGS. 3D and 3E, the substrate 1 was left as it was at 23° C. under 1 atm. (1013 hecto Pa) to volatilize the solvent included in the coated resin composition. Then, when the weight (weight after volatilization) of the coated resin composition after the volatilization of the solvent became 93% or less of the weight (initial weight) of the coated resin composition just after the application thereof, the volatilization of the solvent was performed under a depressurized condition (for several minutes at 40° C. under 700 hecto Pa). Furthermore, baking processing (at 90° C. for 100 sec) was performed. Incidentally, the initial weight could be calculated by measuring the weights of the wafer before and after the application of the coated resin composition to calculate the difference. The weight after the volatilization could be calculated by calculating the difference between the weight of the wafer after leaving the wafer for a certain time as it was (after the volatilization of the solvent) and the weight of the wafer before the application of the coated resin composition. Moreover, the times of leaving the example and a comparative example as they were (at 23° C. under 1 atm.), the ratios of the example and the comparative example to their initial weights after their leaving as they were, and the thicknesses of their compatible material layers are listed in Table 1. The compatible material layers 22 were cured regions of the mixtures of the material of the flow path pattern 10 and the coated resin layer, and were supposed to be the parts included in the regions in which the flow path pattern 10 had existed at the time point of forming the flow path pattern 10 (before the application of the coated resin layer) among the finished flow path walls on the substrate 1.

Next, as illustrated in FIG. 3F, exposure and development were preformed to form the pattern of the coated resin layer 12. Moreover, a water repellent 13 was formed on the coated resin layer 12 by laminating dry films. The ink discharge ports 14 were formed by patterning the coated resin layer 12 and the water repellent 13 by the exposure and development with a deep UV ray.

Next, as illustrated in FIG. 3G, the front surface and the side surface of the substrate 1, on which the resolvable resin and the coated resin layer 12 were formed, were covered by a protective material 15 by the spin coat method. Then, in the $SiO_2$ film 6 formed on the back surface of the substrate 1, a Si surface of a starting surface of wet etching was exposed by using the polyether amide resin 8 as a mask. Next, the ink supply port 16 was formed in the substrate 1. The ink supply port 16 was formed by chemically etching the substrate 1 by the anisotropic etching using a strong alkaline solution of TMAH. As illustrated in FIG. 3H, by the execution of the anisotropic etching from the back surface, the anisotropic etching reached the sacrifice layer (not illustrated) on the front surface to form the ink supply port 16. Next, the polyether amide resin 8 and the protective material 15 were removed. Furthermore, by eluting the resolvable resin from the ink discharge ports 14 and the ink supply port 16, the ink flow paths 25 were formed. The thickness of the discharge port forming part of the coated resin layer 12, which was the flow path forming member, was 55 μm.

Next, the substrate 1, in which nozzle portions were formed, was cut to be separated with a dicing saw to be made into chips. Thus, a part of the ink jet head of FIG. 2 was produced.

After that, electric joining for driving the energy generating elements was performed, and a tank member for supplying ink was attached. Thus, the ink jet head was completed.

The average values of the compatible layers of a plurality of heads of examples and compatible examples obtained from the same wafer were acquired as layer thicknesses. Moreover, each of the completed ink jet head was mounted on a discharge apparatus, and discharge evaluations were performed. The results are shown in Table 1. As shown in Table 1, a comparative example 1 had much dispersion of the thicknesses of the compatible layers, and had the tendency of slowing the re-filling speed of ink in a thick part.

Incidentally, the judgments of Table 1 are as follows.

A: Long time discharging in a good state was performed at a high discharge frequency in all the heads obtained from one wafer.

B: Discharging was possible at a high discharge frequency in all the heads obtained from one wafer. Some heads needed to once discontinue the discharge thereof in the case of performing the discharge for a long time.

C: Some of the heads obtained from one wafer had some discharge ports that did not discharge any ink in the case of performing discharge at a high frequency.

TABLE 1

|  | Example 1 | Example 2 | Example 3 | Example 4 | Comparative Example 1 |
| --- | --- | --- | --- | --- | --- |
| Leaving Time after Application at 23° C. under Atmospheric Pressure | 240 sec | 180 sec | 120 sec | 90 sec | 0 sec |
| Ratio of Weight of Coated Resin Composition after Volatilization by Being Left at 23° C. under Atmospheric Pressure to Initial Weight Thereof | 85 | 87 | 90 | 93 | 100 |
| Layer Thickness of Compatible Material Layer (μm) | 1.5 | 1.8 | 2.4 | 2.6 | 2.9 |
| Judgment | A | A | A | B | C |

From the above, it can be known that the solvent is suitably volatilized at a normal temperature under the atmospheric pressure so that the weight of the coated resin layer may become 93% or less of the initial application after the application of the coated resin layer, following which the solvent is suitably removed under depressurized condition or by heating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-278461, filed Oct. 29, 2008, which is hereby incorporated by reference herein in its entirety.

What is claimed is:

1. A method of manufacturing a liquid discharge head including a flow path member for forming a flow path communicating with a discharge port discharging a liquid, the method comprising the steps of:

providing a mold of the flow path made of a positive photosensitive resin on a substrate;

applying a coated layer on the mold for forming the flow path member, the coated layer including a solvent, an epoxy resin, and a curing agent of the epoxy resin;

removing the solvent from the coated layer at a normal temperature under substantially 1 atm. so that the weight of the coated layer may become 93% or less of that of the coated layer at a time of the applying of the coated layer, and then further removing the solvent from the coated layer under a depressurized condition;

curing the coated layer; and removing the mold to form the flow path.

2. The method according to claim 1, wherein the step of removing the solvent is executed by removing the solvent from the coated layer at the normal temperature under substantially 1 atm. so that the weight of the coated layer may become 90% or less of that of the coated layer at the time of the applying of the coated layer.

3. The method according to claim 1, wherein the positive photosensitive resin includes polymethyl isopropenyl ketone.

4. The method according to claim 1, wherein the solvent is xylene.

5. The method according to claim 1, wherein the step of providing the mold is executed by applying the positive photosensitive resin with a solvent of cyclohexanone to form the mold of the positive photosensitive resin.

6. The method according to claim 1, wherein the normal temperature is that within a range of 23 to 40° C., both inclusive.

7. The method according to claim 1, wherein substantially 1 atm. indicates an atmospheric pressure within a range of 1000 to 1020 hecto Pa.

* * * * *